United States Patent [19]

Picard

[11] Patent Number: 4,804,199
[45] Date of Patent: Feb. 14, 1989

[54] CROSS-COUNTRY VEHICLE

[76] Inventor: Didier Picard, 24 rue Montpensier, 75 001 Paris, France

[21] Appl. No.: 124,379

[22] Filed: Nov. 20, 1987

Related U.S. Application Data

[63] Continuation of Ser. No. 75,422, Jul. 20, 1987, abandoned.

[30] Foreign Application Priority Data

Jun. 18, 1987 [FR] France ................. 87 08532

[51] Int. Cl.⁴ ............................................ B62D 31/00
[52] U.S. Cl. ............................ 280/33.998; 280/781; 296/185; 296/198
[58] Field of Search .............. 280/33.99 R, 33.99 T, 280/725, 781; 220/1.5; 206/509, 511; 296/102, 185, 198

[56] References Cited

U.S. PATENT DOCUMENTS

| | | | |
|---|---|---|---|
| 1,912,847 | 6/1933 | Klepel | 280/33.99 T |
| 2,457,842 | 1/1949 | Smith et al. | 220/1.5 |
| 2,463,310 | 2/1944 | Probst | 280/790 X |
| 2,923,268 | 2/1960 | Fletcher et al. | 280/33.99 T |
| 2,963,301 | 12/1960 | Rosenkrands | 280/725 |
| 3,049,359 | 8/1962 | Geyer | 280/725 |
| 3,201,143 | 8/1965 | Drong | 280/725 X |
| 3,522,954 | 8/1970 | Locke | 280/33.99 T |

FOREIGN PATENT DOCUMENTS

| | | |
|---|---|---|
| 1284856 | 8/1961 | Fed. Rep. of Germany . |
| 2834178 | 8/1978 | Fed. Rep. of Germany . |
| 3525251A1 | 7/1985 | Fed. Rep. of Germany . |
| 1158632 | 6/1958 | France ............. 280/33.99 T |

*Primary Examiner*—David M. Mitchell
*Assistant Examiner*—Michael Mar
*Attorney, Agent, or Firm*—Larson and Taylor

[57] ABSTRACT

The vehicle of the "Jeep" type is arranged in a substantially symmetrical manner in particular with respect to a transverse median plane and comprises, on a chassis formed by side members and cross members (1), (2) which are respectively symmetrical and each formed by two semi-side members or two semi-cross members which are identical, two symmetrical longitudinal body elements (6) interconnected by a transverse element (8). The structure has surfaces (6c) for receiving and supporting a superposed identical vehicle.

17 Claims, 2 Drawing Sheets

CROSS-COUNTRY VEHICLE

This application is a continuation-in-part of application Ser. No. 075,422 filed July 20, 1987, now abandoned.

The present invention relates to a cross-country motor vehicle of the "Jeep" type which may have both civil and military applications.

Many vehicles of this type already exist but however have various drawbacks and insufficiencies.

An object of the invention is to provide a novel cross-country vehicle which is transportable by air under improved conditions and is simple and cheap.

Another object of the invention is to provide such a vehicle which is easy to manufacture by small industrial units on the condition of using already existing complex units such as the kinematic chain, shock absorbers and the steering device.

Another object of the invention is to provide such a vehicle in respect of which maintenance and repairs are easy and whose logistic is simplified, in particular from the point of view of the manufacture and stocking of spare parts.

A further object of the invention is to provide such a vehicle which has a large transporting capacity although its length is short A still further object of the invention is to provide a vehicle which is particularly practical from the point of view of both the rolling and road holding properties of the vehicle, in particular over open ground, and the transporting, loading and unloading of persons and loads.

The invention provides a cross-country vehicle of the "Jeep" type having two axles and preferably a chassis carrying the body, and preferably four driving wheels, wherein means are provided for receiving another identical vehicle by superposition.

However, the invention also concerns a vehicle of the self-supporting monopiece body type including said means for receiving another vehicle.

Advantageously, the body has, above each wheel, a preferably planar receiving surface supporting the corresponding wheel of the superposed vehicle, fastening means preventing the separation of the two vehicles.

In this way it is possible to transport the vehicles by air in groups of two superposed vehicles, which considerably increases the filling capacity of the transporting aircraft.

The structure of the vehicle is so designed as to support the load of the superposed vehicle, at least for an acceleration of 2 g, when landing. For transport over the ground or water, three vehicles may in practice be superposed.

According to a preferred feature of the invention which facilitates the superposition possibilities, the vehicle is arranged, in the region of the chassis and body, in a substantially symmetrical manner in the direction of the length.

Thus the body or shell may advantageously comprise two longitudinal elements disposed laterally which are self-supporting and form cavities for the wheels of the respective side and support surfaces for the two corresponding wheels of the superposed vehicle. These longitudinal elements may advantageously be welded constructions, in particular based on one or more bent section members. They preferably include a lower central region corresponding to the passage of the front and rear passengers located between two parts upwardly inclined at an angle preferably on the order of 60° planar end parts surmounting the wheels and parallel to the lowered central part, are also provided although these parts may also be at least partly upwardly inclined toward the end of the vehicle so as to oppose a possible longitudinal displacement of the superposed vehicle.

These elements are preferably carried by a chassis composed of two side members and two end cross members with cantilever arms in median positions.

The side members then have a symmetrical shape adapted to the elements and to the passage of the front and rear driving axles. They may each be very advantageously formed by two identical C-section semi-side members fitted together and welded alongside each other to form a tubular side member, so that it is possible to press-form a single type of semi-side member to produce the two side members.

The cross members may also be formed from C-section semi-cross members with the same advantages.

Lateral lugs extending from the central part of the side members may also be made identical.

Whereas other components may be identical to one another and in particular the longitudinal suspension arms or struts and the suspension pots. Each axle may also be associated with a Panhard type of bar.

Preferably, the two longitudinal body or shell elements may be interconnected by a transverse element in the form of an elongate box structure constructed by welding and fixed to the longitudinal elements preferably in the region of one of the inclined parts of the longitudinal elements, this permits a still further stiffening of the body and at the same time the provision of a panel receiving the dashboard elements, the windshield and the engine hood. This element is easily detachable to permit access to the engine and its auxiliary equipment.

At the rear, floors may interconnect the two longitudinal elements. A rear hatchback and a front radiator grille may also be used for interconnecting the two longitudinal elements.

Preferably, the various elements, such as the side members, the cross members, the longitudinal body elements, the transverse element and other elements may be assembled by a separable assembly, such as eye-members, bolts, studs and nuts facilitating the rapid replacement of an element. Some connections, in particular between the chassis and the body, may have a certain degree of freedom.

The power unit is located, for example, in the front, between the two longitudinal elements and above the front driving axle the space thus defined is long and easily accessible from above, below, the front and the rear so that different conventional power units may be mounted, such as those of the makes Land Rover, Toyota, Peugot P4, Mercedes G, etc.

The transverse element may be adjusted to any desired height to adapt it to the particular chosen engine.

It will be understood that a vehicle arranged in this way is easy to manufacture and repair by means which are not overly complex.

Further features and advantages of the invention will be apparent from the following description which is given by way of a non-limiting example with reference to the accompanying drawing, in which:

FIG. 7 is a diagrammatic elevation view of the vehicle according to another embodiment of the invention.

The illustrated vehicle has the dimensions: 3.30 m long×1.70 m wide; its height above the ground with the tires inflated is 1.15 m with the windshield lowered. The track is 2.40 m.

Figure 3:
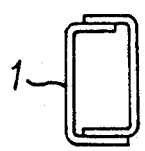
FIGS. 3 to 6 are diagrammatic sectional views of a side member, a cross member, a longitudinal element and a transverse element.

The chassis is formed by two side members 1 which are rectilinear in the center and upwardly inclined adjacent to their ends. Each side member 1 is formed by two semi-side members (see FIG. 3) which extend throughout the length and are fitted together and welded alongside each other on the upper and lower flanges. Four identical semi-side members, formed by a press-formed C-section member, enable two tubular side members to be formed.

Figure 4:
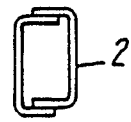
Figure 5:
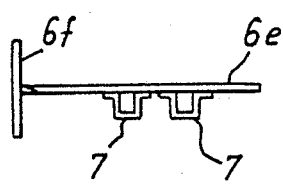
Figure 6:
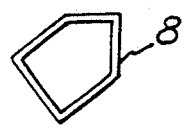

The main tubular cross members 2 are rectilinear in the center and inclined at the two ends and are formed, in the same way, from semi-cross members (see FIG. 4) which are all identical and fitted together and welded alongside each other. These cross members are also pressed out with a single press tool.

The two cross members 2 are welded to the ends of the side members, 1 their inclined arms extending beyond the frame thus obtained for structuring the body.

Extending outwardly from each side member 1 are two welded lugs 3 having an omega-section, and brackets 4 for the articulation of the suspension arms or struts 5. The lugs, brackets and arms are all respectively identical to one another.

Mounted on each cross member 1 is a longitudinal body element 6 which is a welded construction including two parallel omega-section members 7. The longitudinal element 6 has, as its section members 7, a lowered rectilinear central part 6a, two inclined parts 6b and two end parts 6c. The whole longitudinal element 6 being, in the same way as the side members of the chassis, symmetrical relative to a transverse median plane of the vehicle. The section members 7 have this contour. The transverse element comprises a folded metal sheet 6e supported by the section members 7 and a vertical cutout side wall 6f. The longitudinal elements 6 are mounted on and bolted to the lugs 3 which carry their section members 7 and on the cross members 2 adjacent to the ends of the elements 6.

Figure 1:
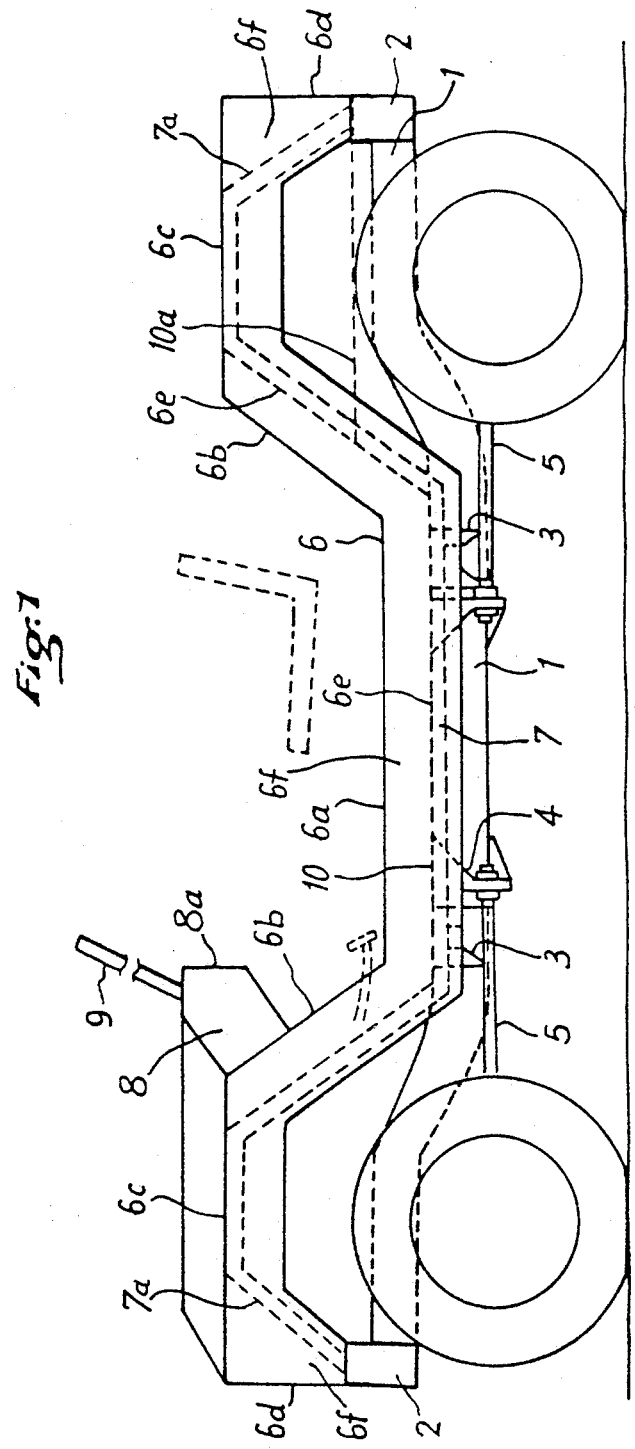
FIG. 1 is a diagrammatic elevational view of the vehicle according to the invention.
Figure 2:
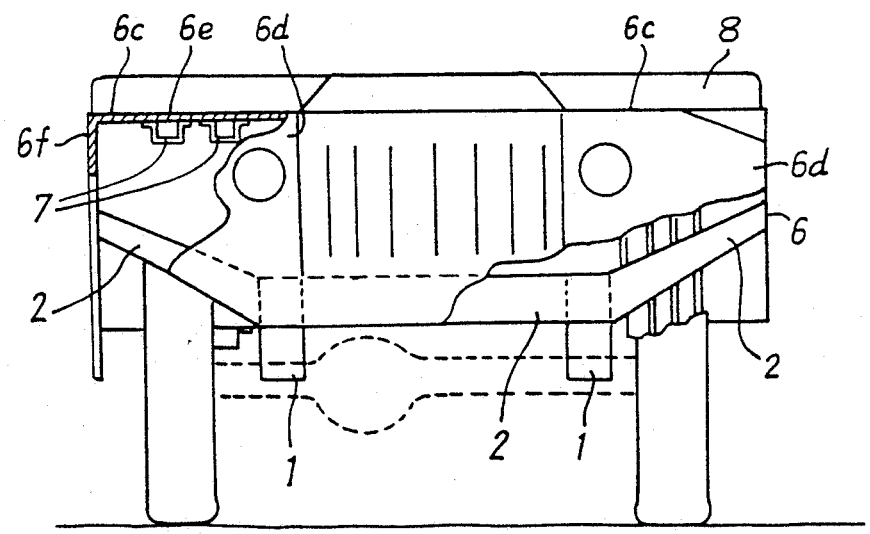
FIG. 2 is a front elevational view.

A box-structured transverse element 8, whose section is seen in FIG. 1, is fixed to the front inclined parts 6b and thus interconnects the two elements 6. The element 8 has a vertical rear part 8a for receiving the dashboard elements, a horizontal upper part receiving the windshield 9 and an inclined part receiving the hood.

The longitudinal elements 6 are closed at their front and rear ends by transverse panels 6d which stiffen the elements at their two ends and receive the lights. Such an element 6, which is stiffened by the structure and the presence of the two inner omega-section members 7, forms, above the wheels, the two surfaces 6c on which bear the wheels of a superposed identical vehicle with a sufficient resistance to deformation, including conditions involving a landing at 2 g.

The two elements 6 are also interconnected by plates acting as a floor 10 and a rear platform 10a these plates are, if desired, supported by small omega-section members whose ends would be fixed or welded against the longitudinal elements. The plates 10, 10a are fixed to the sheet 6e.

Referring to FIG. 7, there is shown an embodiment where the omega-section members 7 have end parts which do not horizontally extend to reach the front and rear end panels 6d but which are inclined downwardly at 7a to reach the cross members 2.

The assembly therefore forms a very coherent structure comprising the chassis formed by the two side members 1 with their two cross members 2 which interconnect them at their front and rear ends, thereby forming a frame on which is fixed, with the possibility of a rapid disassembly, the body structured around the two longitudinal elements 6 interconnected by the transverse element 8, by the floor and platform 10, 10a and accessorily by the front radiator grille and a rear hatchback.

The vehicle constructed in this way has good handling qualities and an excellent road-holding performance.

What is claimed is:

1. A cross-country vehicle comprising one axle at a front portion and one axle at a rear portion, wheels carried by the axles, and a body or shell carried by the axles, said body or shell being arranged in a substantially symmetrical manner in the direction of the length of the vehicle, wherein said body or shell comprises two self-supporting integral longitudinal elements disposed laterally and defining cavities for the wheels on the respective side of the vehicle, wherein said longitudinal elements have a lowered central part for the passage of front and rear passengers, two upwardly inclined parts extending from opposite ends of said lowered part, and two planar parts surmounting the wheels of the vehicle and extending substantially horizontally from said upwardly inclined parts, said vehicle including a central raised hood between said planar parts at the front portion of said vehicle and a raised member extending between the top portion of the inclined parts at the front portion of the vehicle, wherein said planar parts define a receiving surface for supporting the corresponding wheel of another identical vehicle which another vehicle is received by superposition and fastened to the vehicle.

2. A vehicle according to claim 1, wherein the vehicle has such structure as to be capable of supporting the load of said superposed vehicle at least in respect of an acceleration of 2 g.

3. A vehicle according to claim 1, wherein said upwardly inclined parts are at an angle of substantially 60° to the horizontal.

4. A vehicle according to claim 1, wherein each of said two longitudinal elements includes at least one suitably bent section member, a folded sheet of metal supported by said section member, and a substantially vertical side wall integral with said sheet of metal.

5. A vehicle according to claim 4, wherein said section member is an omega-section member.

6. A vehicle according to claim 4 wherein said section member has two end parts which are inclined downwardly to reach substantially identical cross members connected at the ends of two substantially identical side members, where said cross members and said side members are respectively substantially symmetrical in the direction of the length thereof.

7. A vehicle according to claim 1, comprising a chassis having two substantially identical side members which are substantially symmetrical in the direction of the length thereof.

8. A vehicle according to claim 7, wherein each side member comprises two C-section semi-side members fitted together and welded alongside each other to form a tubular member, whereby a single form of semi-side member is sufficient in the construction of the chassis.

9. A vehicle according to claim 7, wherein the chassis has substantially identical cross members which are substantially symmetrical in the direction of the length thereof.

10. A vehicle according to claim 8, wherein each cross member comprises two C-section semi-cross members fitted together and welded alongside each other to form a tubular member, whereby a single form of semi-cross member is sufficient in the construction of the chassis.

11. A vehicle according to claim 10, comprising, front and rear suspension arms or struts, and front and rear suspension pots, the arms or struts and the suspension pots extending from the chassis and are all being respectively substantially identical to each other.

12. A vehicle according to claim 11, further comprising lateral support lugs which extend from the chassis and are identical to one another.

13. A vehicle according to claim 1, further comprising elements constituting a dashboard, and wherein said raised member is a transverse element interconnecting the two longitudinal elements and defining a surface for receiving said elements constituting the dashboard.

14. A vehicle according to claim 1, comprising a power unit mounted between the two longitudinal elements at the front of the vehicle.

15. A vehicle according to claim 1, comprising a chassis to which the body or shell elements are fixed to permit a rapid separation thereof.

16. A vehicle according to claim 1, comprising a chassis having two side members and cross members which are respectively substantially identical and substantially symmetrical to one another in the direction of the length thereof and comprise C-section semi-side members and C-section semi-cross members which are fitted together and welded alongside each other so as to form a tubular element, a single form of a semi-side member and semi-cross member respectively being sufficient in the construction of the chassis.

17. A cross country vehicle comprising:
one axle at a front portion, one axle at a rear portion and wheels carried by the axles,
a chassis to which the axles are mounted, said chassis including two side members and cross members which are respectively substantially identical and substantially symmetrical to one another in the direction of the length of the vehicle;
a body or shell carried by the axles, said body or shell being arranged in a substantially symmetrical manner in the direction of the length of the vehicle, wherein said body or shell comprises two self-supporting integral longitudinal elements disposed laterally and defining cavities for the wheels on the respective side of the vehicle, wherein each said longitudinal element includes (a) a folded sheet of metal having a lowered central part for the passage of front and rear passengers, two upwardly inclined parts extending from opposite ends of said lowered part, and two planar parts surmounting the wheels of the vehicle and extending substantially horizontally from said upwardly inclined parts, (b) at leaast one suitably bent section member which supports said folded sheet, said section member having two end parts which are inclined downwardly and which are supported by respective said cross members, and (c) a substantially vertical side wall integral with said folded sheet such that said planar parts define a receiving surface for supporting the corresponding wheel of another identical vehicle which another vehicle is received by superposition and fastened to the vehicle.

* * * * *